United States Patent [19]

Kerslake et al.

[11] Patent Number: 5,128,962
[45] Date of Patent: Jul. 7, 1992

[54] LINE INTERFACE CIRCUIT AND A METHOD OF TESTING SUCH A CIRCUIT

[75] Inventors: Richard M. Kerslake, Bedford; Frank R. Fattori, Clapham, both of United Kingdom

[73] Assignee: Texas Instruments Incorporated, Dallas, Tex.

[21] Appl. No.: 523,784

[22] Filed: May 15, 1990

[30] Foreign Application Priority Data

Jun. 16, 1989 [GB] United Kingdom ............... 8913952

[51] Int. Cl.⁵ .................... H04B 3/46; H04B 17/00
[52] U.S. Cl. ....................... 345/7; 340/511; 340/514; 371/20.5; 375/10
[58] Field of Search ............... 375/7, 10, 36; 371/48, 371/20.5, 24, 71; 340/511, 514, 310 R; 455/67; 370/110.1, 17, 15

[56] References Cited

U.S. PATENT DOCUMENTS

| | | | |
|---|---|---|---|
| 4,393,508 | 7/1983 | Boudault | 371/20.5 X |
| 4,993,045 | 2/1991 | Alfauso | 370/15 |

Primary Examiner—Benedict V. Safourek
Assistant Examiner—Tesfaldet Bocure
Attorney, Agent, or Firm—William E. Hiller; Richard L. Donaldson

[57] ABSTRACT

A line interface circuit sends two-level signals to a line and receives two-level signals from a line. The two levels of the signals are on opposite sides of a threshold range of levels. For testing the circuit the transmitter is connected to the receiver by a switchable path, and a test signal is produced by the transmitter for reception by the receiver for monitoring the functioning of the circuit. The test signal is of a small amplitude so as not to enter the threshold range of levels). The connections of the transmitter and receiver to the line are maintained during testing. During testing the output of the transmitter is limited in amplitude by a voltage clamp so that it can produce only the test signal.

15 Claims, 3 Drawing Sheets

LINE INTERFACE CIRCUIT AND A METHOD OF TESTING SUCH A CIRCUIT

This invention relates to line interface circuits and in particular to the testing of such circuits.

In many electronic systems it is required to transfer data between two pieces of equipment, which are often at different locations. This data transfer is usually achieved by means of a dedicated cable connecting the two pieces of equipment. In certain instances the cable can be quite long, for example several hundred meters, and in order to ensure the reliability of the data transfer specialised line drivers and receivers are used at each end of the cable. In order to simplify the connection of equipment from different manufacturers standards for the signal transmission along the cables have been adopted which define the electrical characteristics of the line drivers and receivers. Examples of these standards are EIA-RS232, EIA-RS423 and EIA-RS422.

Line interface circuits include the line drivers and receivers and are susceptible to failures such as the shorting together of two conductors within a cable or damage to the line driver or receiver as result of electrical overstress. It is therefore essential to be able to test line interface circuits to ensure their functionality. The common form of test is the loopback test, which is usually performed by removing the connection to the line from the interface and replacing it with another connector in which the driver or drivers in the interface are directly connected to an associated line receiver or receivers. In the test, data is sent from a line driver and its correct receipt by a receiver can be checked. Using this test, a fault can be traced to an individual driver/receiver pair or by deduction to a problem within the cable itself.

A major disadvantage with this test is that the cable must be disconnected from the interface circuit and a loopback connector inserted in its place before the test can be carried out. A more efficient system would be to integrate the loopback connections within the interface circuit itself so that it would not be necessary to disconnect the line physically from the interface circuit. A testing circuit of that kind could be added to a line interface circuit by introducing serial switches between the driver and the line, and the line and the receiver, together with a cross connecting switch directly from the driver to the receiver. Disadvantages of such an arrangement are that the contacts of the series connected switches could become unreliable and introduce additional faults, and that if the circuit were implemented using relays the cost and size of such relays could be unacceptable. Semiconductor switches could be used in place of mechanical switches which would overcome the second disadvantage, but the disadvantage of additional series switches along the signal transmission paths remains.

It is an object of the present invention to provide a means and method for testing a line interface circuit in which the above disadvantages are avoided.

According to one aspect of the present invention there is provided a line interface circuit having output means for feeding an output signal to a first conductor of the line, the output signal having parts with a steady level above a threshold range of levels and parts with a steady level below the threshold range of levels, input means for receiving an input signal from a second conductor of the line, and means for selectively applying a signal from the output means directly to the input means without traversing the line to enable the circuit to be tested, wherein the output means includes means for selectively producing a test signal on one of the steady levels of the output signal and which is of such limited amplitude that it does not cross the threshold level, so that during a test it is not necessary to disconnect the output means from the line, and the input means includes means responsive to the test signal to provide an indication of the functioning of the circuit.

The signals on the line may be in accordance with a standard, such as EIA-RS232, EIA-RS423 or EIA-RS422.

The output means may include a clamp circuit to limit the amplitude of the test signal.

The means responsive to the test signal may be arranged to detect specific component failures in the output means and the input means.

The line interface circuit may be constructed as a single integrated circuit and may include more than one output means and/or more than one input means.

According to another aspect of the present invention there is provided a method of testing a line interface circuit having output means for feeding a two-level output signal to a line and input means for receiving a two-level input signal from a line, the method including providing a test signal in place of the output signal, connecting the output means directly to the input means and detecting the test signal in the input means, the test signal being such that it does not cross a threshold level between the two levels of the two-level input or output signal.

The test signal may be a small amplitude signal on one of the two levels of the output signal.

The test signal may be generated by clamping the output signal so that it cannot cross the threshold level between the two levels of the output signal.

The method may provide for testing for failure of specific components of the circuit.

The line interface circuit and the method of testing have a number of advantages. One advantage is that it is not necessary to disconnect the output means or the input means from the line during testing because the test signal would not be interpreted as data by other interface circuits connected to the line because it does not cross the threshold level. Consequently there is no need for series switches between the interface and the line. Unplugging the line from the interface circuit and substituting a shorting plug connected to join the transmitter to the receiver are also rendered unnecessary.

An example of a line interface circuit and a method of testing such a circuit will now be described with reference to the accompanying drawings, of which:

Taking the standard EIA-RS232 as an example, the output voltage of the data transmitter must be more negative than −5 volts for a logic 1 (marking state) and be more positive than +5 volts for a logic 0 (spacing state). When no data is being sent the output voltage of the transmitter is in the marking state, that is to say at a voltage more negative than −5 volts. In accordance with one example of the invention, when the transmitter output is in the marking state and no data is being sent, a small amplitude test signal is superimposed on the output of the transmitter, the amplitude of the signal being such that at no time does the transmitter output voltage become less negative than −5 volts. This restriction on the amplitude of the test signal means that any receiver connected to the data line driven by the transmitter unit will not detect any change in the logic state of the line. This restriction of the amplitude of the test signal has the advantage that it is not necessary to disconnect the transmitter from the line when the test signal is being generated because any receiver connected to the line unit will not read spurious data from the test signal. By causing the transmitter itself to generate the test signal it is possible to test the functionality of some parts of of the transmitter by observing the test signal.

Figure 1:
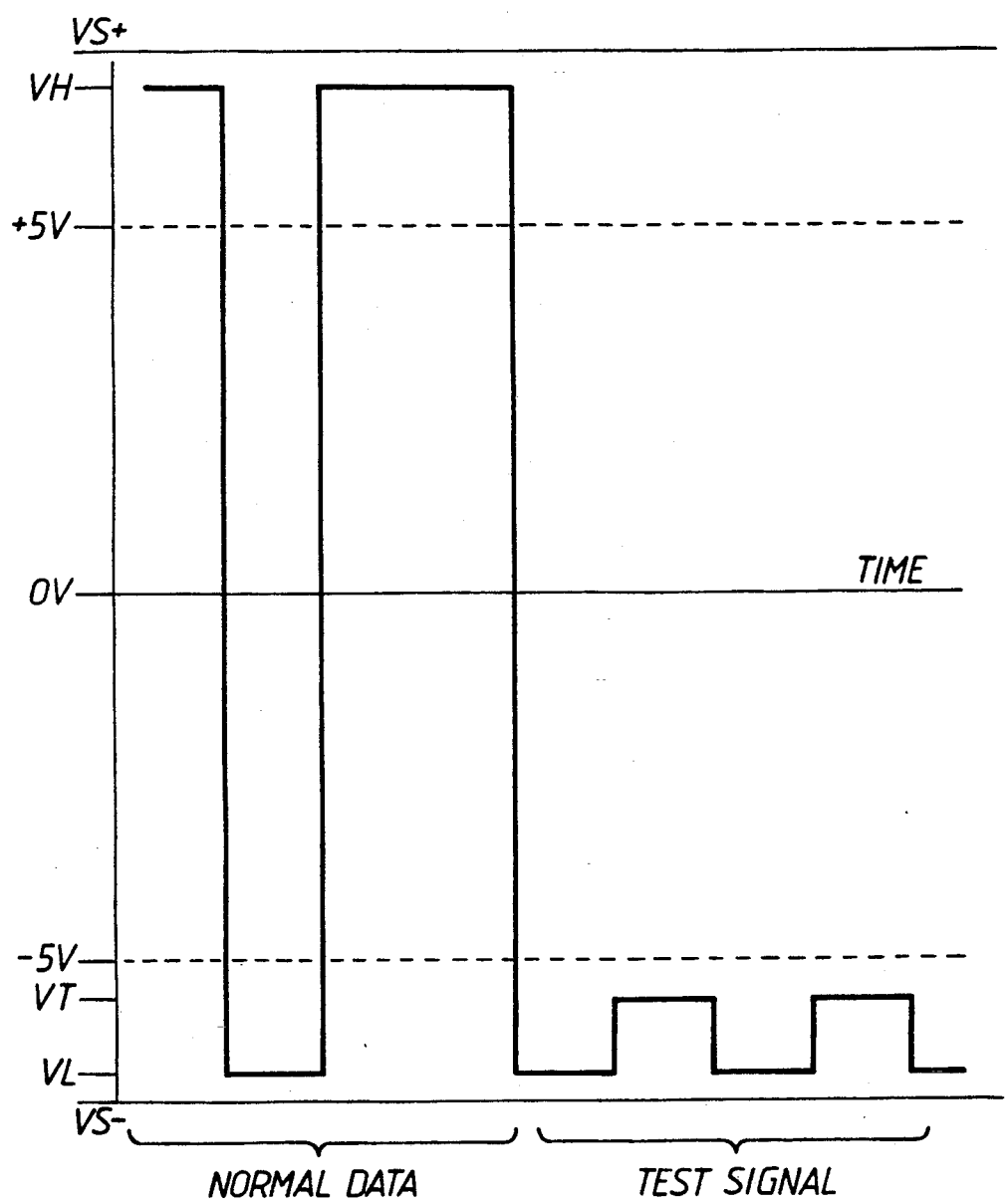
FIG. 1 shows the voltage waveform of one form of test signal with data signal of one possible standard form.

FIG. 1 shows the waveform of normal data together with the waveform of a test signal. The normal data extends from a positive voltage VH which is more positive than +5 volts, to a negative voltage VL which is more negative than −5 volts. The voltage VH represents logic 0 or the spacing state of the signal and the voltage VL represents logic 1 or the marking stage of the signal. The test signal extends from VL to VT, where VT is more positive than VL but more negative than −5 volts. The range of voltages from −5 volts to +5 volts forms a threshold range between the logic 1 and logic 0 states of the data signal.

Also shown in FIG. 1 are the positive and negative supply voltages VS+, VS−, which are used to supply the output amplifier of the transmitter. In a typical design of output amplifier, two transistors are connected in series between the supply conductors with the output connection to the line connected to the junction of the two transistors. In order to transmit the logic 1 state, the transistor connected to the negative supply line is rendered conducting whilst the other transistor is non-conducting, and when a logic 0 state is to be applied to the line the transistor connected to the positive supply line is rendered conducting whilst that connected to the negative line is non-conducting.

Figure 2:
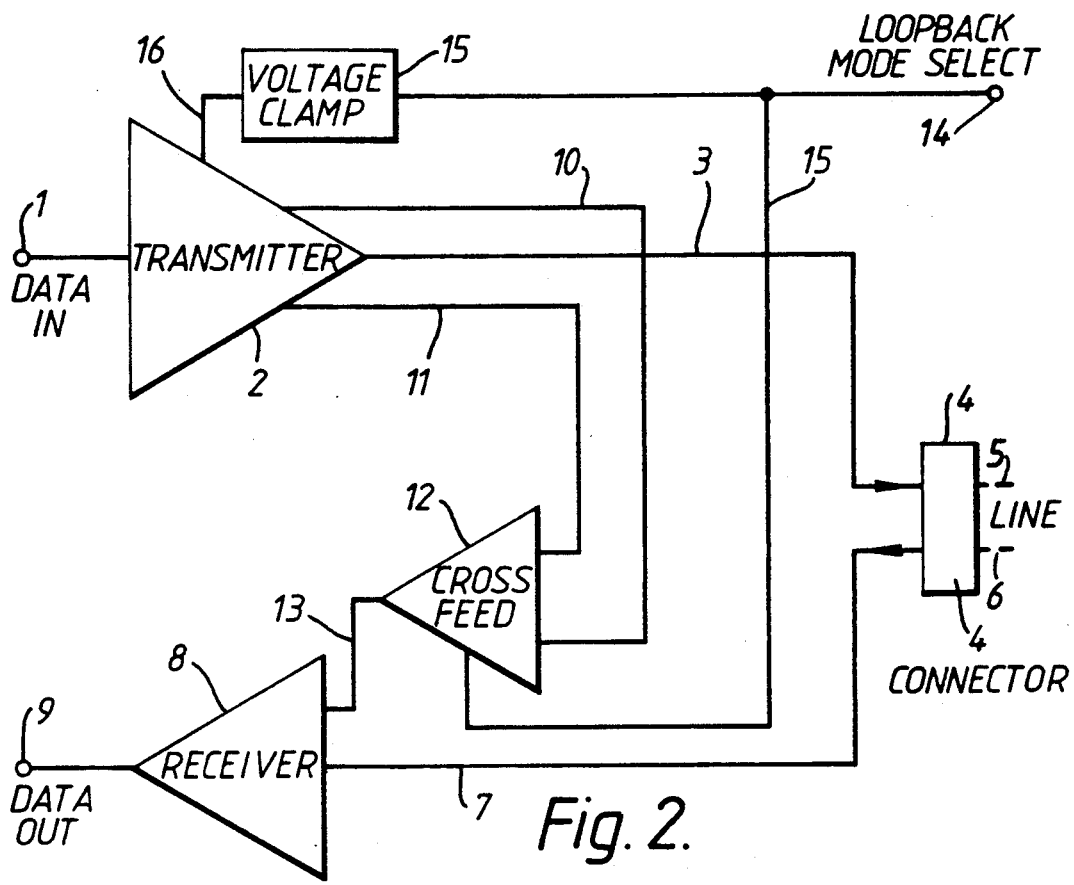
FIG. 2 is a block diagram of the example of a line interface circuit.

FIG. 2 is a block diagram of an example of a line interface circuit according to the invention. Digital data to be transmitted over a line is applied via a terminal 1 to a transmitter 2. The output signal of the transmitter 2 appears on a conductor 3 which is connected through a connector 4 to a conductor 5 of the line. Data incoming over the line to the circuit is received along a conductor 6 which is connected by the connector 4 through a conductor 7 to a receiver 8 which produces the incoming data in a required form at a terminal 9.

For testing the circuit shown in FIG. 2, the transmitter 2 has additional output conductors 10 and 11 which are connected as inputs to a cross feed unit 12 having an output conductor 13 connected to the receiver 8. The cross feed unit 12 is controlled by a loopback mode select signal applied to it via a terminal 14 and a conductor 15. The terminal 14 is connected to a voltage clamp 15 which is connected via a conductor 16 to limit the amplitude of the voltage output from the transmitter 2 when the loopback mode is selected.

When the circuit of FIG. 2 is transmitting and receiving normal data, the cross feed unit 12 and the voltage clamp 15 are not operated. Digital data from circuits connected to the input of the transmitter 2 and which have the voltages appropriate to those circuits which may be for example, TTL or CMOS, are converted by the transmitter 2 to have the voltage levels VL and VH shown in FIG. 1, and are applied via the conductor 3 and the connector 4 to the conductor 5 of the line. Data incoming from the line on the conductor 6 have the voltage levels VL and VH and are converted by the receiver 8 to have the voltage levels appropriate to the type of digital circuit connected to the terminal 9.

When the line interface circuit of FIG. 2 is to be tested, an enabling signal is applied to the terminal 14 to select the loopback mode. This enabling signal activates the voltage clamp 15 and the cross feed unit 12. The effect of the voltage clamp 15 is to restrict the output signal of the transmitter 2 to the voltage levels VL and VT. This restriction on the output signal of the transmitter 2 means that any receiver connected to the conductor 5 of the line will interpret the output from the transmitter 2 as a logic 1 because the voltage VT of the test signal is not positive of the −5 volt threshold. The logic 1 state output from the transmitter 2 is its rest state. The cross feed unit 12 receives via the conductors 10 and 11 the test signal from the transmitter 2 and is enabled by the signal from the terminal 14 to apply that test signal via a conductor 13 to the receiver 8. The input circuit of the receiver 8 is so constructed that the effect of the switching between the levels VT and VL when applied by the cross feed unit 12 to the conductor 13 appears to that input circuit to be the same as normal data received along the conductor 6 from the line. In this way the functioning of both the transmitter 2 and the receiver 8 can be tested without the need to disconnect them from the conductors of the line. As will be explained later, the receiver input circuit is designed so that, in the loopback mode, any data appearing on the conductor 16 and therefore also on the receiver input 7 is ignored, only data from the cross feed switch 12 being accepted.

Figure 3:
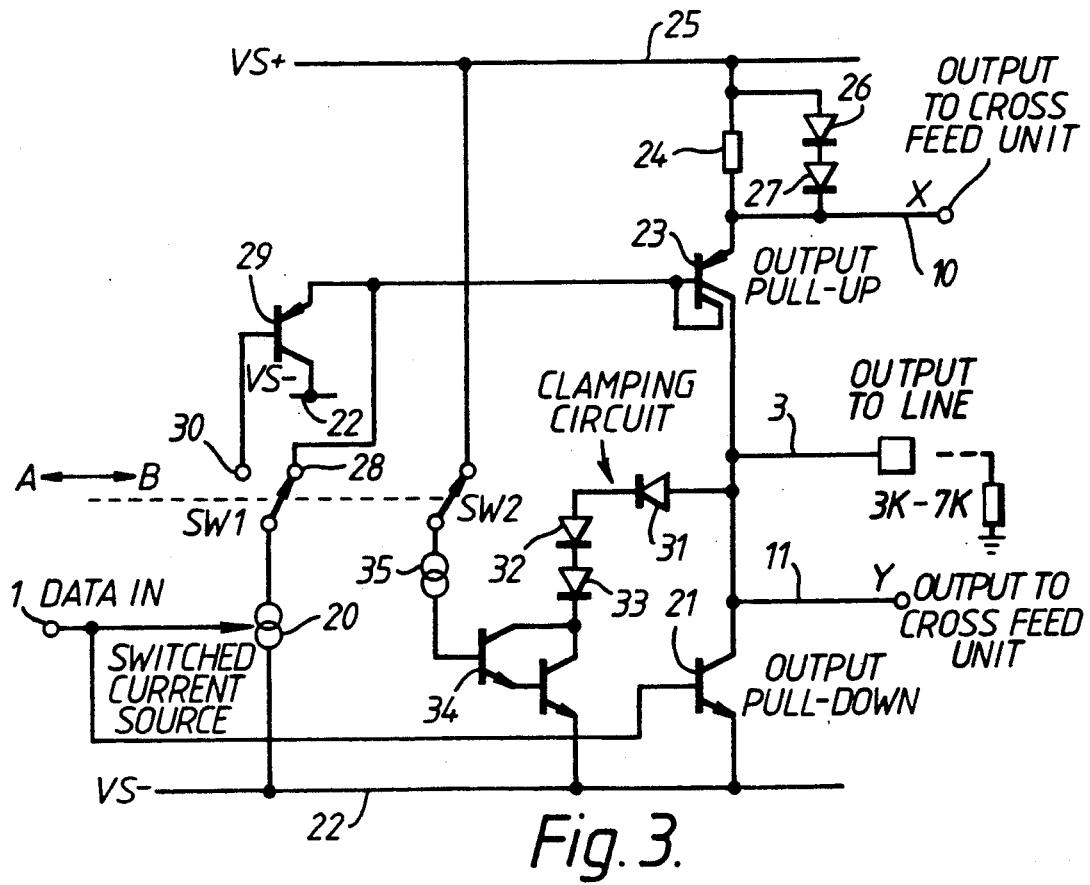
FIG. 3 is a simplified diagram of the transmitter of the line interface circuit.

FIG. 3 shows in simplified form a circuit of an example of the transmitter 2. The conductors 3, 10 and 11 and the terminal 1, shown in FIG. 2, are marked in FIG. 3. The terminal 1 is connected to control a switched current source 20 and also applied to the base of a transistor 21. The connections from the terminal 1 to the current source 20 and the base of the transistor 21 may be through an amplifier or other circuit to change the current or voltage ranges as required. Both the current source 20 and the emitter of the transistor 21 are connected to a negative supply conductor 22. The collector of the transistor 21 is connected to the conductors 3 and 11, and in addition to the collector of a transistor 23. In the example shown in FIG. 3 the conductors 3 and 11 are connected together; this is not necessarily the case in all forms of the transmitter. The emitter of the transistor 23 is connected to the conductor 10 and also through a resistor 24 to a positive supply conductor 25. Two diodes 26 and 27 in series are connected in parallel with the resistor 24. The transistor 23 is provided with a second collector which is connected directly to its base to enable the first collector of that transistor to act as a controlled current source. The base of the transistor 23 is connected to a contact 28 of a switch SW1 and also to the emitter of a transistor 29. The collector of the transistor 29 is connected to the negative supply conductor 22 and its base to a contact 30 of the switch SW1. A clamping circuit is connected from the conductors 3 and 11 to the negative supply conductor 22 and consists of diodes 31, 32 and 33 in series with a Darlington transistor 34 the emitter of which is connected to the negative supply conductor 22. The base of the Darlington transistor 34 is connected through a current source 35 and a switch SW2 to the positive supply conductor 25. The switches SW1 and SW2 are operated together and, as shown in FIG. 3, have positions A and B respectively corresponding to the non-selection and the selection of the loopback mode.

In practice, the circuit shown in FIG. 3 is constructed as part or all of an integrated circuit with the current sources constructed in a conventional way. The switching of the current sources could be effected by providing an alternative path for the current produced by the source when no current is required. Similarly, the switches SW1 and SW2 could be provided by suitably connected transistors controlled by an electrical selection signal.

In the operation of FIG. 3, when it is transmitting normal data over the conductor 3 to the line, the data signals applied to the terminal 1 serve to render the transistors 21 and 32 conducting alternately so as to produce output voltage levels on the conductor 3 close to the supply voltages on the conductors 22 and 25. Under these conditions, the clamping circuit is not effective because the Darlington transistor 34 is not conducting.

When the loopback mode is selected and the switches SW1 and SW2 are in position B, the transistor 23 continues to operate as a switch but is limited to supplying a current of about 1 milliamp out of its collector to the conductors 3 and 11 when the current source 20 is supplying current, whereas in normal operation the transistor 23 can supply a much larger current set by the emitter-resistor 24. The transistor 21 is switched on and off by the digital signals applied to the terminal 1, but the voltage on its collector is limited in excursion between a voltage close to that of the negative supply conductor 22 when the transistor 21 is conducting, to a voltage, approximately equal to four times the forward conducting voltage of a diode, imposed by the clamping circuit, and in particular by the diodes 31, 32 and 33 and the collector-emitter voltage of the Darlington transistor 34, because in this condition the Darlington transistor 34 is rendered conducting by current from the current source 35. In a typical case, the negative supply voltage is −12 volts so that the most positive voltage which is generated on the conductors 3 and 11 is about −9 volts.

The conductor 10 conveys the voltage at the emitter of the transistor 23 to the cross feed unit 12. If the transistor 23 is operating correctly, then the voltage on the conductor 10 varies between VS+, the voltage on the positive supply conductor 25, and a voltage more negative than VS+ by the forward conducting voltages of the two diodes 26 and 27. If the transistor 23 has failed, then the voltage on the conductor 10 remains at twelve volts because the current supplied by the source 20 is low, and the cross feed unit 12 can be arranged to detect the presence of twelve volts on conductor 10 in these circumstances so as to monitor the operational state of the transistor 23. Failure of the transistor 23 in an open-circuit condition will still allow the voltage on the conductors 3 and 11 to switch between the voltage levels as described above. If, on the other hand, the transistor 23 failed in a short-circuit condition the voltage on conductors 3 and 11 would stay close to the positive supply voltage.

Figure 4:
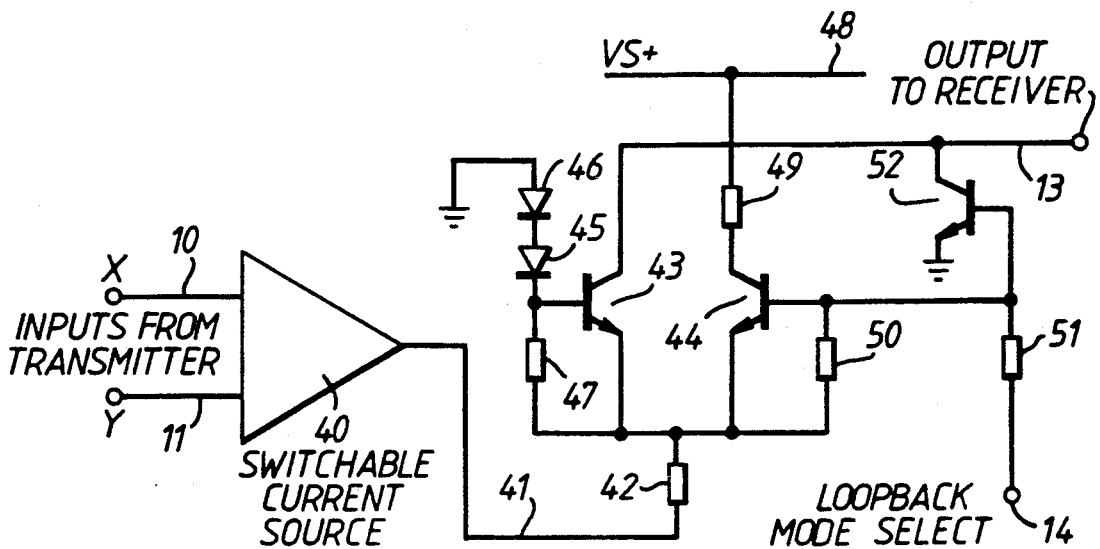
FIG. 4 is a diagram of the cross feed unit of the line interface circuit.

FIG. 4 is a simplified diagram of the cross feed unit 12 shown in FIG. 2. In FIG. 4, the conductors 11 form the inputs to a switchable current source 40, the output current of which is fed via a conductor 41 and a resistor 42 to the emitters of transistors 43 and 44. The base of the transistor 43 is connected through the diodes 45 and 46 in series to ground and through a resistor 47 to its emitter. A collector of the transistor 43 is connected to the conductor 13 to provide the output to the receiver 8. The collector of the transistor 44 is connected to a positive supply conductor 48 through a resistor 49. The base of the transistor 44 is connected to its emitter through a resistor 50 and to the loopback mode select signal terminal 14 through a resistor 51. The base of the transistor 44 is also connected to the base of a transistor 52 having its emitter-collector path connected between the conductor 13 and ground.

The switchable current source 40 responds to the voltage on the conductor 10 to detect whether or not the transistor 23 (FIG. 3) is functioning or not. The voltage on the conductor 11 varies over a range of about three diode forward conduction voltages from about −9 volts to −11.5 volts. The current source 40 draws either a zero current or a current of about 60 microamps through the resistor 42. When the loopback mode is not selected, a positive voltage supplied to the terminal 14 causes the transistors 44 and 52 to be conducting. The transistor 44 serves to bypass the current drawn by the source 40 and the transistor 52 short-circuits the conductor 13 to ground, so that no signals are applied to the receiver. When the loopback mode is selected, both transistors 44 and 52 are non-conducting and the switched currents drawn by the source 40 are drawn from the conductor 13 through the transistor 43. This current drawn from the conductor 13 forms the input to the receiver from the cross feed unit 12.

Figure 5:
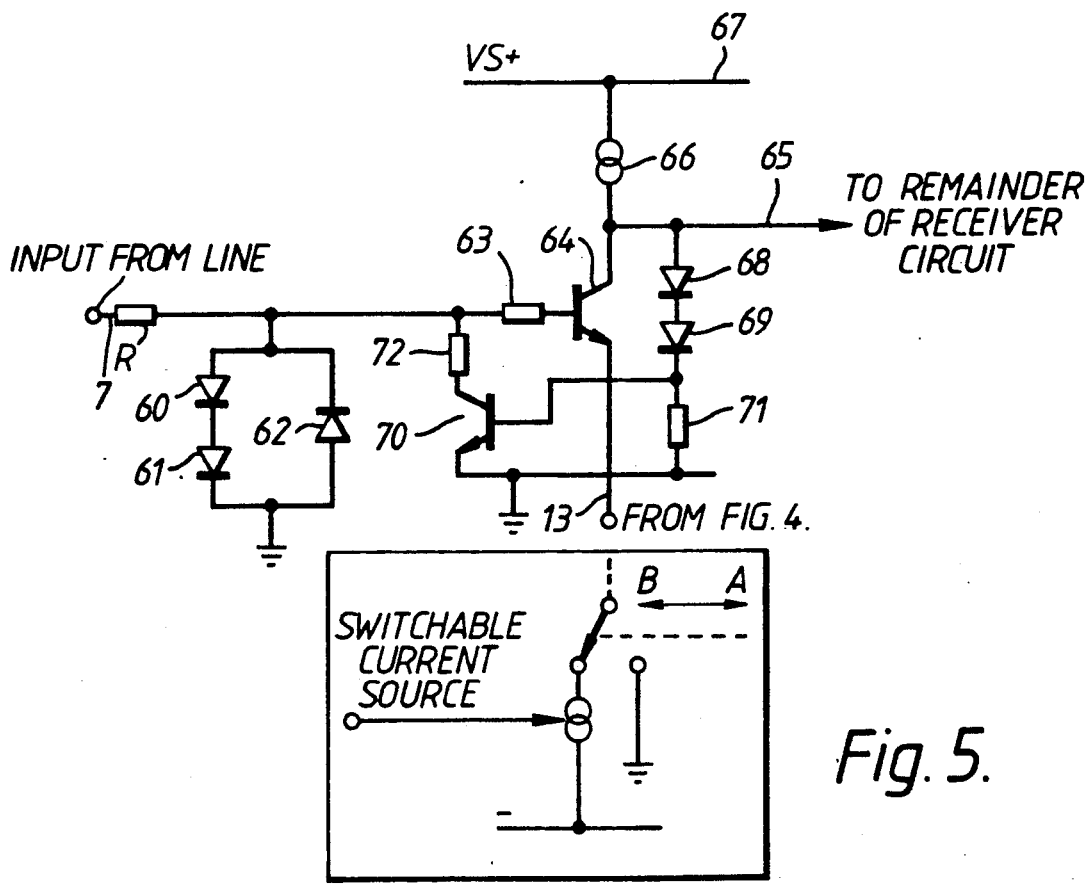
FIG. 5 shows the input circuit of the receiver of the line interface circuit.

FIG. 5 shows the input circuit of the receiver 8 (FIG. 2) with the conductor 13 which connects it to the cross feed unit 12, shown in FIG. 4, and the conductor 7 which connects the receiver to the line.

The conductor 7 is connected through a resistor R which sets the input impedance of the circuit to the value required by the particular standard (in this case EIA-RS232). The resistor R is connected to a voltage limiting circuit having diodes 60 and 61 in series connected in parallel with a third diode 62, all in a path to ground. The resistor R is also connected through a further resistor 63 to the base of transistor 64 of which the emitter is connected to the conductor 13. The collector of the transistor 64 is connected to the remainder of the receiver circuit by a conductor 65 and to a current source 66 joined to a positive supply conductor 67. The conductor 65 is connected through diodes 68 and 69 in series to the base of a transistor 70 and also through a resistor 71 to ground. The emitter of the transistor 70 is also connected to ground. The collector of the transistor 70 is connected through a resistor 72 to the function of the resistor R and the resistor 63. The circuit shown in the rectangle 73 is a simplified equivalent circuit of the cross feed unit shown in FIG. 4, showing how a switched current is drawn from the conductor 13 with the pulses of the test signal when the loopback mode is selected.

The transistor 64 forms the first stage of the receiver and operates as a common emitter amplifier for signals received from the line via conductor 7 and as a common base amplifier for the test signals received as currents via the conductor 13. The transistor 70, together with components 68, 69, 71 and 72, serve to provide hysteresis on the input receiver.

The circuits described above have the following additional advantages. The design of the output circuit of the transmitter as shown in FIG. 3, together with the use of a clamping circuit to limit the voltage swing on its output during testing, means that it is possible to ensure that in many cases a failure of the output circuit, due to electrical overstress for example, would result in neither the normal data nor the low level test signal being able to be transmitted, so that the satisfactory emission of the test signal would indicate that the circuit would satisfactorily emit the normal data. Faults which interfere with the emission of the normal data but which do not impede the emission of the test signal could occur, and such faults would require other means for their detection. Moreover, many faults on the line itself can be detected; for example, if the conductor 5 of the line is shorted to a low impedance voltage source, then the voltage on the conductor 11 may be unable to swing sufficiently for the test signal to be detected by the cross feed unit 12 and the receiver 8.

The design of the input circuit of the receiver is such that once the correct operation of the transistor 64 has been confirmed, it is possible to say that the receiver is functioning correctly provided that the output signals are obtained as expected. The current drawn by the source 40 (FIG. 4) is larger than the current supplied by the source 66 (FIG. 5). When the loopback mode is not selected, i.e. in the normal mode, the transistor 52 conducts. The conductor 65 now sits high or low depending on the state of the receiver input 7 which acts like an inverter. If the input 7 is low, then the conductor 65 is high, and vice versa. In the loopback mode, the transistor 43 conducts. As the current from the source 66 is lower in size than the current generated by the source 40, the state of the conductor 65 depends wholly on whether the source 40 is on or off. If the source 40 is on, then the conductor 65 is low, and if the source 40 is off then the conductor 65 is high. It is to be noted that the transistor 44 is used in normal operation to dump the current from the source 40 to the positive supply rail. Transistors 43 and 44 act as a switch. In the loopback mode, the conductor 13 (FIG. 1) is close to zero volts. During operation in the loopback mode the transistor 64 is insensitive to inputs on its base so that any signals incoming to the receiver from the line will be ignored.

Although the invention has been described with reference to an example for use in accordance with EIA-RS232, similar examples for use with EIA-RS432 and EIA-RS422 could be produced.

What is claimed is:

1. A line interface circuit comprising:
   transmitter means having an output conductor for providing an output signal varying between steady voltage levels above and below a threshold level to a first conductor of the line;
   receiver means for receiving an input signal from a second conductor of the line at a first input thereof;
   said transmitter means having auxiliary output conductor means for providing an output signal of a limited amplitude restricted so as to be entirely disposed on one side of the threshold level;
   means connected to said auxiliary output conductor means of said transmitter means and to said receiver means at a second input thereof so as to be interposed between said transmitter means and said receiver means for selectively applying a signal from said transmitter means directly to said receiver means and independently of the line to enable the line interface circuit to be tested;
   means operably connected to said transmitter means and to said selective signal-applying means for selectively producing a test signal corresponding to a steady voltage level of the output signal and of a limited amplitude restricting the test signal from crossing threshold level; and
   said receiver means including means responsive to the test signal to provide an indication of the functioning of the line interface circuit;
   the performance of a test of the line interface circuit in response to the selective production of a test signal being accomplished independently of the connection of said output conductor of said transmitter means to the first conductor of the line so as to be performable regardless of whether said output conductor of said transmitter means is connected to the first conductor of the line.

2. A line interface circuit as said forth in claim 1, wherein said auxiliary output conductor means of said transmitter means comprises auxiliary first and second output conductors for respectively providing a test signal to said receiver means via said selective signal-applying means varying between first and second steady voltage levels at limited magnitudes, each of which is restricted from crossing the threshold level.

3. A line interface circuit as said forth in claim 2, wherein said means for selectively producing a test signal includes clamping means connected to said transmitter means for restricting the output signal of said transmitter means during a testing procedure to voltage levels respectively provided to said first and second auxiliary output conductors and of a limited amplitude restricting the test signal from crossing the threshold level;
   a control conductor for receiving an enabling signal connected to said clamping means and to said selective signal-applying means;
   said clamping means and said selective signal-applying means being respectively actuated in response to the occurrence of the enabling signal on said control conductor;
   said clamping means, when actuated, restricting the output signal delivered by said transmitter means to said auxiliary first and second output conductors to voltage levels of limited magnitude restricting the test signal from crossing the threshold level; and
   said selective signal-applying means, when actuated, producing the test signal from said auxiliary first and second output conductors of said transmitter means as maintained at the limited amplitude restricting the test signal from crossing the threshold level.

4. A line interface circuit as said forth in claim 3, wherein said selective signal-applying means comprises a cross-feed switch device alternately applying the test signal as output from said transmitter means from said auxiliary first and second output conductors to the second input of said receiver means.

5. A line interface circuit as set forth in claim 3, wherein said transmitter means further includes
   first and second transistors;
   first and second voltage supply conductors;

said first and second transistors being connected in series between said first and second voltage supply conductors;

a junction node between said first and second transistors being connected to the first conductor of the line;

said first and second transistors being respectively conductive and non-conductive at one steady voltage level of the output signal and being respectively non-conductive and conductive at the other steady voltage level of the output signal; and the output current of said first transistor being limited in value in response to the selective production of the test signal and the voltage at the junction node between said first and second transistors being restricted by the actuation of said clamping means.

6. A line interface circuit as set forth in claim 5, further including resistive means disposed between said first transistor and said first voltage supply conductor connected thereto the junction node between the resistive means and said first transistor being connected to said selective signal-applying means such that said selective signal-applying means can monitor the operational state of said first transistor.

7. A line interface circuit as set forth in claim 3, wherein said receiver means further includes a first stage having a transistor provided with a control component;

the control component of said transistor of said receiver means being connectable to a second conductor of the line; and said selective signal-applying means being connected to an electrode region of said transistor included in the first stage of said receiver means.

8. A line interface circuit as set forth in claim 7, wherein said selective signal-applying means applies a switched current to the electrode region of the transistor included in the first stage of said receiver means.

9. A line interface circuit as set forth in claim 3, wherein output and input signals applied to and received from the line are standardized signals.

10. A method of testing a line interface circuit having a transmitter and a receiver for sending and receiving a signal varying between a first voltage level and a second voltage level to and from respective conductors of the line, wherein the transmitter provided an output signal to a first conductor of the line and the receiver receives an input signal from a second conductor of the line, said method comprising the steps of:

providing a test signal from the transmitter of a limited amplitude restricted so as to be entirely disposed on one side of a threshold level above and below which the first and second voltage levels of the output signal are disposed, in place of the output signal;

connecting the transmitter directly to the receiver independently of the conductors of the line;

selectively applying the test signal corresponding to a steady level of the output signal and of a limited amplitude restricting the test signal from crossing the threshold level to the receiver; and detection the test signal as produced from the receiver independently of the connection of the transmitter to the conductor of the line so as to perform testing of the line interface circuit regardless of whether the transmitter is connected to a conductor of the line.

11. A method of testing a line interface circuit as set forth in claim 10, further including providing the test signal as a small amplitude signal based upon one of the first and second voltage levels of the output signal.

12. A method of testing a line interface circuit as set forth in claim 10, further including alternately applying the test signal from first and second auxiliary output conductors of the transmitter as a test signal varying between first and second steady voltage levels at limited magnitudes; and restricting each oft eh first and second voltage levels as provided by the auxiliary output conductors of the transmitter from crossing the threshold level as provided to said receiver.

13. A method of testing a line interface circuit as set forth in claim 10, further including clamping the output signal of the transmitter during a testing procedure to voltage levels of a limited amplitude restricting the test signal from crossing the threshold level.

14. A method of testing a line interface circuit as set forth in claim 10, further including selectively applying an enabling signal to said transmitter for placing said transmitter in a test signal mode;

clamping the output signal of said transmitter to voltage levels of a limited amplitude entirely disposed on one side of the threshold level in response to the enabling signal; and producing the test signal from the transmitter as maintained at the limited amplitude restricting the test signal from crossing the threshold value for input to said receiver.

15. A method of testing a line interface circuit as set forth in claim 10, further including sending an additional signal from said transmitter to said receiver indicative of the functionality of an output transistor of said transmitter.

* * * * *